US009453434B2

(12) United States Patent
Tanimura et al.

(10) Patent No.: US 9,453,434 B2
(45) Date of Patent: Sep. 27, 2016

(54) GAS TURBINE ENGINE SYSTEM EQUIPPED WITH RANKINE CYCLE ENGINE

(71) Applicant: KAWASAKI JUKOGYO KABUSHIKI KAISHA, Kobe-shi, Hyogo (JP)

(72) Inventors: Kazuhiko Tanimura, Akashi (JP); Ryozo Tanaka, Kakogawa (JP); Takao Sugimoto, Kobe (JP); Hiroshi Morishita, Kobe (JP); Karsten Kusterer, Moresnet (BE); Dieter Bohn, Moers (DE); Rene Braun, Aachen (DE)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 71 days.

(21) Appl. No.: 14/390,282

(22) PCT Filed: Apr. 2, 2013

(86) PCT No.: PCT/JP2013/060039
§ 371 (c)(1),
(2) Date: Oct. 2, 2014

(87) PCT Pub. No.: WO2013/151028
PCT Pub. Date: Oct. 10, 2013

(65) Prior Publication Data
US 2015/0059341 A1    Mar. 5, 2015

(30) Foreign Application Priority Data

Apr. 5, 2012  (JP) ................................. 2012-086211

(51) Int. Cl.
*F01K 23/10* (2006.01)
*F02C 6/18* (2006.01)
(Continued)

(52) U.S. Cl.
CPC ............... *F01K 23/10* (2013.01); *F01K 25/08* (2013.01); *F02C 1/05* (2013.01); *F02C 6/18* (2013.01);
(Continued)

(58) Field of Classification Search
CPC .......... F01K 23/10; F01K 23/06; F02C 6/18
USPC ............................... 60/641.8–641.15, 39.182
See application file for complete search history.

(56) References Cited

U.S. PATENT DOCUMENTS 4,261,166 A    4/1981  Mayrhofer
4,720,968 A    1/1988  Knizia
(Continued)

FOREIGN PATENT DOCUMENTS

CN    1113290 A    12/1995
CN    1807860 A    7/2006
(Continued)

OTHER PUBLICATIONS

Communication dated Sep. 9, 2015 from the State Intellectual Property Office of P.R. China in corresponding Chinese application No. 201380018481.2.
(Continued)

*Primary Examiner* — Thomas Denion
*Assistant Examiner* — Mickey France
(74) *Attorney, Agent, or Firm* — Sughrue Mion, PLLC

(57) ABSTRACT

A combined-type gas turbine engine system is provided which achieves high efficiency by very effectively using exhaust heat from a gas turbine engine. In a gas turbine engine system including: a compressor for compressing a first working medium; a heater for heating the compressed first working medium by an external heat source; a turbine for outputting power from the first working medium; an intermediate cooler provided at the compressor for cooling the first working medium compressed by a low-pressure compression part of the compressor and supplying the first working medium to a high-pressure compression part of the compressor; and an exhaust heat boiler using as a heating medium an exhaust gas from the turbine, a Rankine cycle engine using the intermediate cooler and the exhaust heat boiler as heat sources and a cooling medium of the intermediate cooler as a second working medium.

4 Claims, 4 Drawing Sheets

(51) Int. Cl.

| | | |
|---|---|---|
| *F02C 1/05* | (2006.01) | |
| *F02C 7/143* | (2006.01) | |
| *F02C 7/08* | (2006.01) | |
| *F03G 6/00* | (2006.01) | |
| *F03G 6/06* | (2006.01) | |
| *F01K 25/08* | (2006.01) | |

(52) U.S. Cl.
CPC ............... *F02C 7/08* (2013.01); *F02C 7/143* (2013.01); *F03G 6/005* (2013.01); *F03G 6/064* (2013.01); *F03G 6/067* (2013.01); *Y02E 10/46* (2013.01); *Y02E 20/14* (2013.01); *Y02E 20/16* (2013.01)

(56) References Cited

U.S. PATENT DOCUMENTS

| | | |
|---|---|---|
| 4,896,499 A | 1/1990 | Rice |
| 4,942,736 A | 7/1990 | Bronicki |
| 5,386,685 A | 2/1995 | Frutschi |
| 5,687,570 A | 11/1997 | Bronicki et al. |
| 5,704,209 A | 1/1998 | Bronicki et al. |
| 5,799,490 A | 9/1998 | Bronicki et al. |
| 5,884,470 A | 3/1999 | Frutschi |
| 6,167,706 B1 | 1/2001 | Bronicki et al. |
| 6,212,873 B1 | 4/2001 | Sugishita et al. |
| 6,588,196 B1 | 7/2003 | Bähr et al. |
| 2001/0015060 A1 | 8/2001 | Bronicki et al. |
| 2004/0020206 A1 | 2/2004 | Sullivan et al. |
| 2005/0204723 A1 | 9/2005 | Ouwerkerk |
| 2007/0017207 A1 | 1/2007 | Smith et al. |
| 2009/0121495 A1* | 5/2009 | Mills .................. F01K 3/00 290/4 D |
| 2011/0127773 A1* | 6/2011 | Freund .................. F01K 23/10 290/52 |

FOREIGN PATENT DOCUMENTS

| | | |
|---|---|---|
| CN | 1904324 A | 1/2007 |
| DE | 32 24 577 A1 | 1/1984 |
| DE | 4237665 A1 | 5/1994 |
| DE | 19615911 A1 | 10/1997 |
| DE | 196 52 349 A1 | 6/1998 |
| DE | 19943782 A1 | 3/2001 |
| DE | 102011116425 A1 | 5/2012 |
| EP | 0940563 A2 | 9/1999 |
| EP | 1 179 664 A2 | 2/2002 |
| JP | 57-81104 A | 5/1982 |
| JP | 61-178505 A | 8/1986 |
| JP | 02-271080 A | 11/1990 |
| JP | 4-76205 A | 3/1992 |
| JP | 06-221114 A | 8/1994 |
| JP | 10-231710 A | 9/1998 |
| JP | 11-247669 A | 9/1999 |
| JP | 2000-204909 A | 7/2000 |
| JP | 2005-214143 A | 8/2005 |
| JP | 2007-016791 A | 1/2007 |
| JP | 2007-159225 A | 6/2007 |
| WO | 03/087543 A1 | 10/2003 |

OTHER PUBLICATIONS

International Preliminary Report on Patentability dated Oct. 16, 2014, issued by the International Burea of WIPO in counterpart International Application No. PCT/JP2013/060039.
First Office Action dated Aug. 27, 2015 from the Canadian Intellectual Property Office issued in corresponding Canadian Application No. 2,869,380.
Communication dated Apr. 23, 2015, issued by the State Intellectual Property Office of P.R. China in counterpart Chinese application No. 201380018481.2 Partial Translation.
Notification of Reason(s) for Rejection issued Apr. 23, 2013 on Corresponding JP App. No. 2012-086211.
Notification of Reason(s) for Rejection issued Nov. 12, 2013 on Corresponding JP App. No. 2012-086211.
Decision of Grant issued May 13, 2014 on Corresponding JP App. No. 2012-086211.
International Search Report of PCT/JP2013/060039 dated May 14, 2013 [PCT/ISA/210].
Communication dated Feb. 5, 2016 from the European Patent Office issued in corresponding Application No. 13772193.2.
Jericha, "Brennstoffeinsparung und Umweltschutz bei Warme-Kraft-Kopplung durch modernste Gasturbinen im kombinierten Gas-Dampf-Prozess mit Abwarmeverwertung", E&I Elektrotechnik und Informationstechnik, vol. 109, No. 11/12, (1992), pp. 558-569.

* cited by examiner

GAS TURBINE ENGINE SYSTEM EQUIPPED WITH RANKINE CYCLE ENGINE

CROSS REFERENCE TO THE RELATED APPLICATION

This application is based on and claims Convention priority to Japanese patent application No. 2012-086211, filed Apr. 5, 2012, the entire disclosure of which is herein incorporated by reference as a part of this application.

BACKGROUND OF THE INVENTION

1. Field of the Invention

The present invention relates to a combined-type gas turbine engine system equipped with a Rankine cycle engine which is driven by using exhaust heat from a gas turbine engine.

2. Description of Related Art

In recent years, as a solution to the environment problems or the energy problems, a distributed energy supply system has been proposed in which relatively small power plants are installed near electric power consumers and supply electric power. As one power source which is part of the distributed energy supply system, use of a middle-sized or small-sized gas turbine engine has been suggested (e.g., Patent Document 1). For a distributed power source, it is particularly an important issue to improve the efficiency.

PRIOR ART DOCUMENT

Patent Document

[Patent Document 1] JP Laid-open Patent Publication No. 2007-159225

SUMMARY OF THE INVENTION

However, as a method for improving the efficiency of a middle-sized or small-sized gas turbine, increasing of a temperature or increasing of a pressure ratio is difficult due to restrictions in size. In addition, conventionally, a regenerative cycle in which exhaust heat from a gas turbine is used for preheating a working gas is established, or a cogeneration system using exhaust heat from a gas turbine as a heat source for a steam turbine is established, thereby comprehensively improving the efficiency of the entire system. However, it is very difficult to further increase the efficiency by developing an engine with a low pressure ratio suitable for a regenerative cycle or developing a low-output and high-efficient steam turbine for use in a cogeneration system.

Therefore, in order to solve the above-described problems, an object of the present invention is to provide a combined-type gas turbine engine system which achieves high efficiency by very effectively utilizing exhaust heat from a gas turbine engine.

In order to achieve the above-described object, a gas turbine engine system according to the present invention includes: a compressor configured to compress a first working medium; a heater configured to heat the compressed first working medium utilizing an external heat source; a turbine configured to output power from the first working medium; an intermediate cooler provided at the compressor and configured to cool the first working medium compressed by a low-pressure compression part of the compressor and then supply the first working medium to a high-pressure compression part of the compressor; an exhaust heat boiler using as a heating medium an exhaust gas discharged from the turbine; and a Rankine cycle engine using the intermediate cooler and the exhaust heat boiler as heat sources and using a cooling medium of the intermediate cooler as a second working medium.

With this configuration, not only the exhaust heat from the turbine of the gas turbine engine but also the heat of the working medium passing through the compressor are utilized to drive the Rankine cycle engine, and thus it is possible to obtain very high efficiency for the entire engine system.

In one embodiment of the present invention, the second working medium may be an organic substance, and the second working medium flowing from the intermediate cooler into the exhaust heat boiler may be a superheated gas. With this configuration, by using an organic medium having a lower boiling point than that of water, it is possible to easily make the second working medium having passed through the intermediate cooler, into a superheated gas. As a result, the exhaust heat boiler serves as a superheater. Therefore, it is possible to obtain higher output than that in the case where water is used as the second working medium, and further high efficiency is obtained for the entire engine system.

In one embodiment of the present invention, as the heater, a solar heater configured to heat the first working medium utilizing sunlight as a heat source may be provided. With this configuration, it is possible to increase the efficiency of the engine system while suppressing a load on the environment by using sunlight which is natural energy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
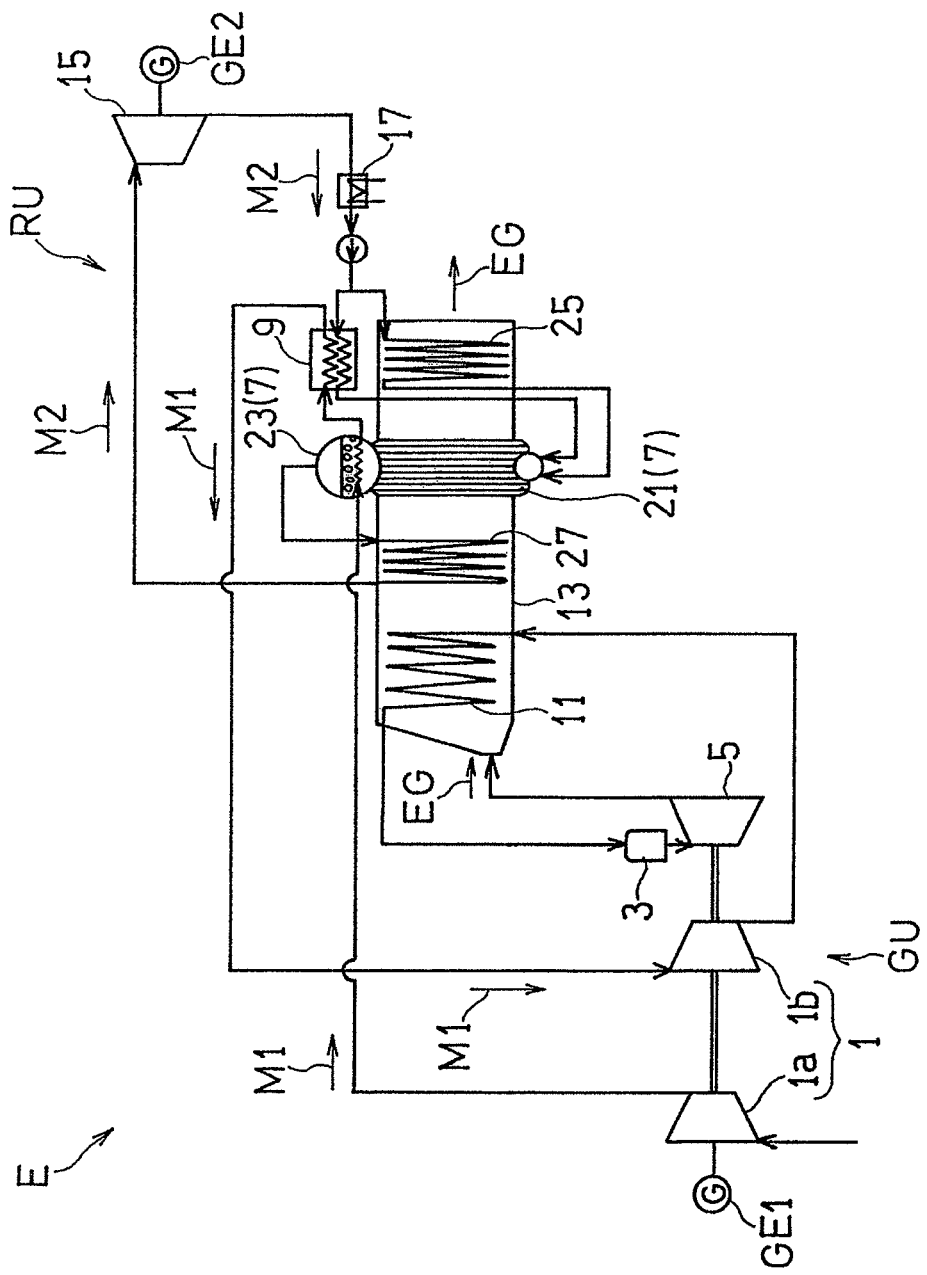
FIG. 1 is a block diagram showing a schematic configuration of a gas turbine engine system according to an embodiment of the present invention.

Hereinafter, embodiments of the present invention will be described with reference to the drawings. FIG. 1 is a schematic configuration diagram showing a gas turbine engine system (hereinafter, referred to simply as "engine system") E according to an embodiment of the present invention. The engine system E includes a gas turbine engine unit GU and a Rankine cycle engine unit RU, and those engine units GU, RU drive respective loads such as generators GE1, GE2.

The gas turbine engine unit GU includes a compressor 1 which compresses a first working medium M1, a combustor 3, which is a heater for heating the first working medium M1 compressed by the compressor 1, and a first turbine 5 which outputs power from the combusted first working medium M1. In the present embodiment, an air may be used as the first working medium M1.

The compressor 1 includes a low-pressure compression part 1a and a high-pressure compression part 1b. An exhaust heat boiler 7 and an intermediate cooler 9 which cool the first working medium M1 compressed by the low-pressure compression part 1a are provided in series in this order between the low-pressure compression part 1a and the high-pressure compression part 1b. The exhaust heat boiler 7 will be described in detail later. By cooling the first working medium M1 compressed by the low-pressure compression part 1a utilizing the exhaust heat boiler 7 and the intermediate cooler 9, compression work to be done by the high-pressure compression part 1b is reduced, and therefore the efficiency is improved. The first working medium M1 flowing from the low-pressure compression part 1a toward the high-pressure compression part 1b may not be passed through the exhaust heat boiler 7 and may be cooled only by the intermediate cooler 9.

The high-pressure first working medium M1 discharged from the compressor 1 passes through a regenerator 11 to be preheated therewith before flowing into the combustor 3, and then is sent to the combustor 3. The regenerator 11 is provided at an upstream portion within an exhaust duct 13 which forms a path for discharging an exhaust gas EG from the first turbine 5 to the outside, and preheats the first working medium M1 flowing from the compressor 1 toward the combustor 3 by using the heat of the high-temperature exhaust gas EG. The exhaust heat boiler 7 is provided on a downstream side of the regenerator 11 in the exhaust duct 13. The exhaust gas EG having passed through the regenerator 11 as a heating medium further passes through the exhaust heat boiler 7 as a heating medium and then is discharged to the outside.

In the Rankine cycle engine unit RU, a second turbine 15 is driven by a second working medium M2 which has been heated into a gaseous state utilizing, as heat sources, the heat of the first working medium M1 passing through the intermediate cooler 9 and heat generated in the exhaust heat boiler 7. The second working medium M2 discharged from the second turbine 15 is condensed by a condenser 17, then passes through the intermediate cooler 9 and the exhaust heat boiler 7 again, and is supplied to the second turbine 15.

The exhaust heat boiler 7 includes a steam generator 21 and a boiler drum 23. The second working medium M2 having passed through the condenser 17 ramifies to flow into the intermediate cooler 9 and an economizer 25. The economizer 25 is disposed at a downstream portion within the exhaust duct 13 and preheats the second working medium M2 utilizing the heat of the exhaust gas EG. Meanwhile, in the intermediate cooler 9, as described above, the first working medium M1 compressed by the low-pressure compression part 1a of the gas turbine unit GU acts as a medium to be cooled, namely, as a heating medium, and the second working medium M2 of the Rankine cycle engine unit RU is preheated utilizing the heat of the first working medium M1.

The Rankine cycle engine unit RU of the present embodiment is configured as an organic Rankine cycle engine which uses an organic substance as the second working medium M2. Specifically, in this example, a petroleum-based organic medium, for example, butane or pentane, may be used. As described above, the second working medium M2 is a low-boiling-point organic medium, thus easily evaporates at the intermediate cooler 9, and is discharged as a superheated gas.

The second working medium M2 preheated by the intermediate cooler 9 or the economizer 25 flows into the steam generator 21 of the exhaust heat boiler 7. The steam generator 21, which is disposed at the upstream side of the economizer 25 for preheating in the exhaust duct 13, heats and evaporates the second working medium M2 utilizing the heat of the exhaust gas EG. The second working medium M2, which has become steam, flows from the boiler drum 23 into a superheater 27. The superheater 27, which is disposed at the upstream side of the steam generator 21 and at the downstream side of the regenerator 11 in the exhaust duct 13, further heats the second working medium M2 which has become steam, and supplies the second working medium M2 to the second turbine 15. It should be noted that the economizer 25 and the superheater 27 may be omitted.

In the above-described process, since a portion of the second working medium M2 flowing into the exhaust heat boiler 7 is heated within the boiler drum 23 by the first working medium M1 from the low-pressure compression part 1a of the compressor 1 as described above, it is possible to increase an amount of steam. Thus, it is possible to obtain very large output at the Rankine cycle engine unit RU, and high efficiency is obtained for the entire engine system E.

Figure 2:
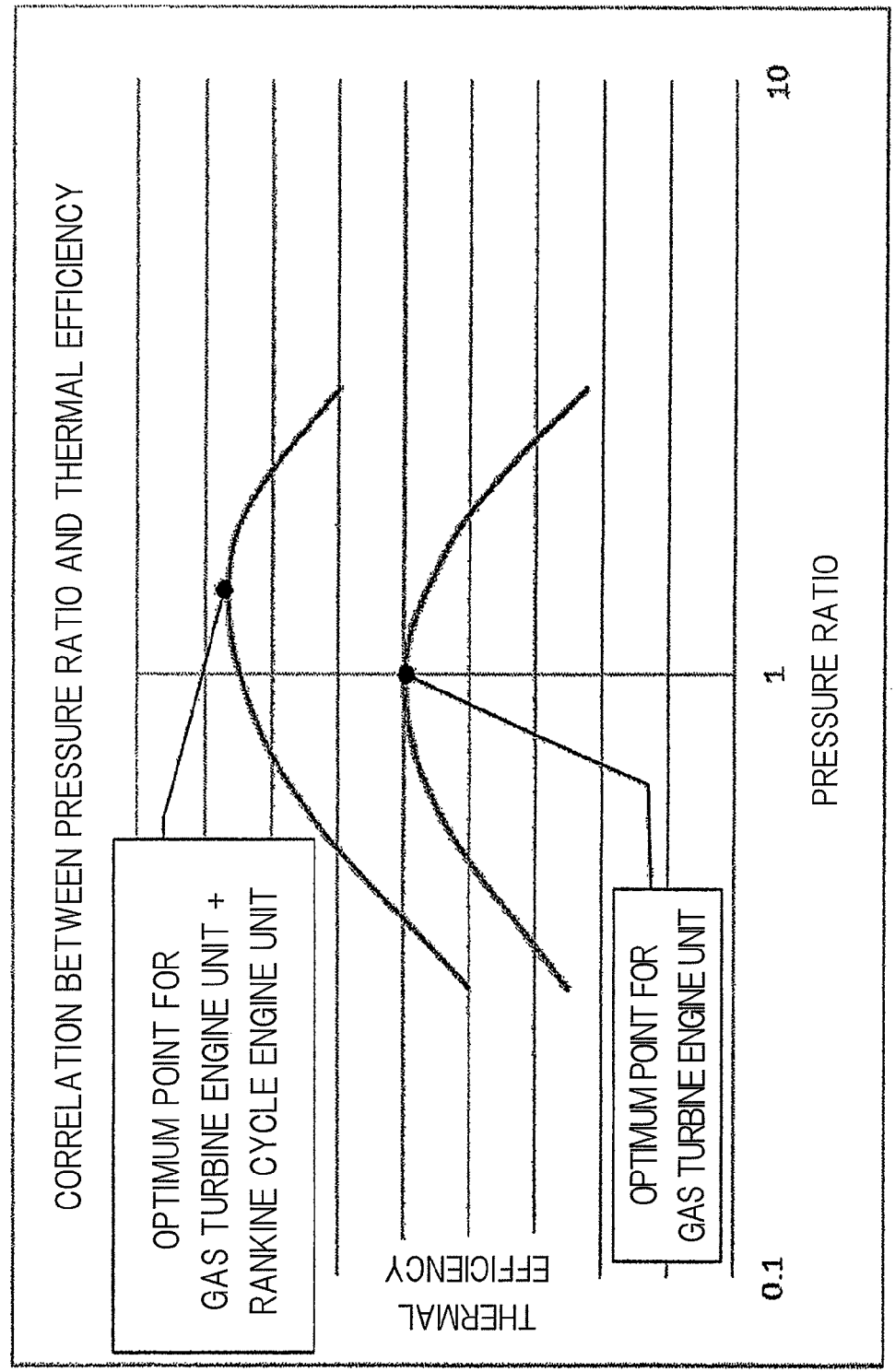
FIG. 2 is a graph for explaining a configuration concept of the gas turbine engine system in FIG. 1.

As described above, for using the two exhaust heat sources for the gas turbine engine unit GU in combination, for example, as shown in FIG. 2, by avoiding an optimum efficiency point for the gas turbine engine unit GU alone (the position between the low-pressure compression part 1a and the high-pressure compression part 1b at which position the intermediate cooler 9 is provided), the design of the gas turbine engine unit GU is adjusted such that a pinch point which is a factor for limiting an amount of steam generated in the evaporation process of the Rankine cycle engine unit RU can be efficiently avoided, whereby it is possible to maximize the efficiency of the entire engine system E. In the example of FIG. 2, a pressure ratio by the low-pressure compression part 1a is set so as to be higher than a value at which the efficiency of the gas turbine engine unit GU alone is maximized.

Figure 3:
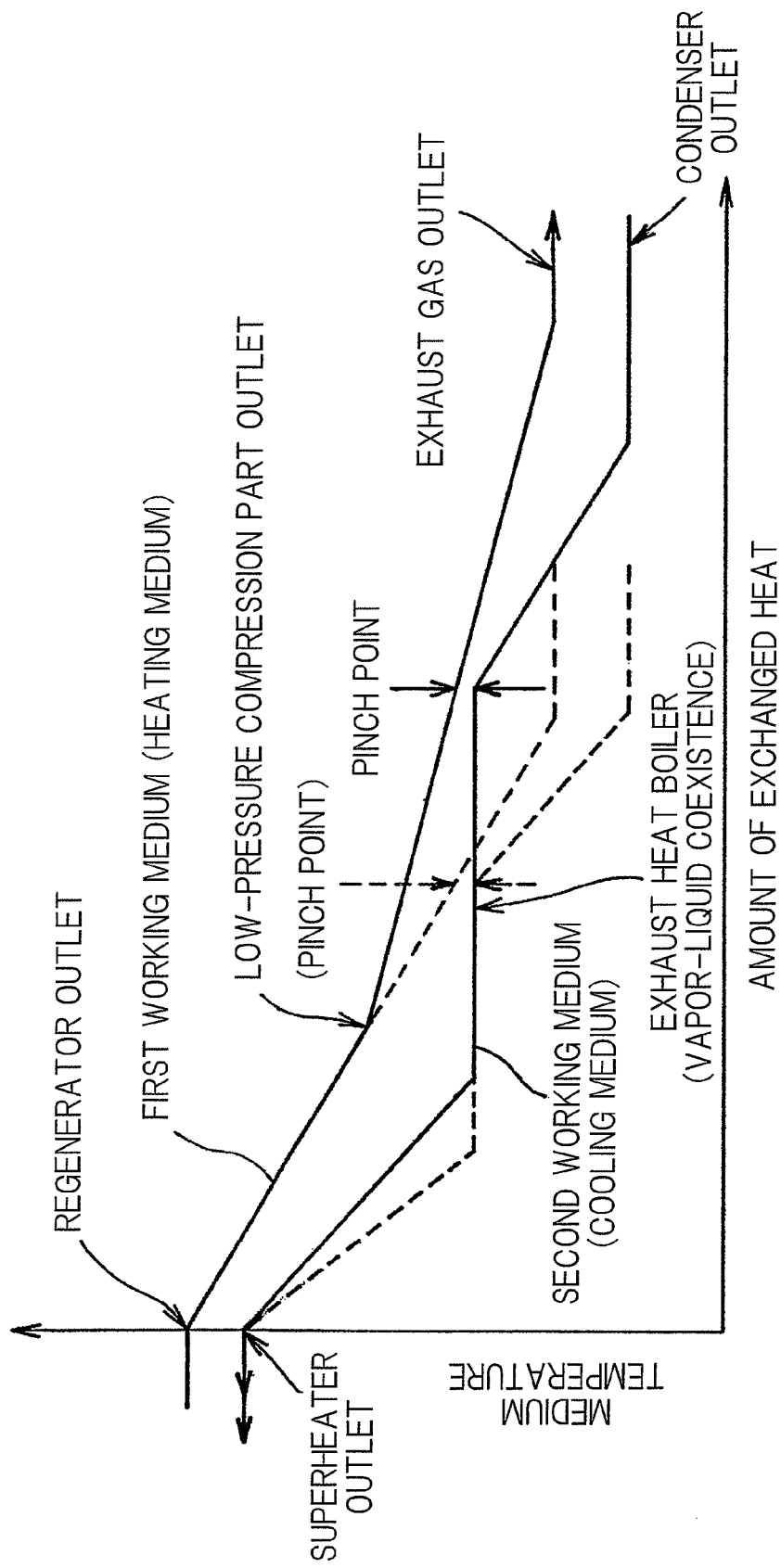
FIG. 3 is a graph for explaining an advantageous effect of the gas turbine engine system in FIG. 1.

In other words, when the second working medium M2 is preheated by the intermediate cooler 9 (indicated by a solid line) as shown in FIG. 3, the quantity of flow of the first working medium M1 flowing through the intermediate cooler 9 is added to the exhaust gas EG as a heating medium, and thus an amount of change (decrease) in temperature with respect to an amount of exchanged heat at the heating medium side is decreased. Thus, as compared to the case where the second working medium M2 is not preheated by the intermediate cooler 9 (indicated by a broken like), an amount of heat exchangeable until reaching a pinch point is significantly increased, and an amount of generated steam is also increased.

Figure 4:
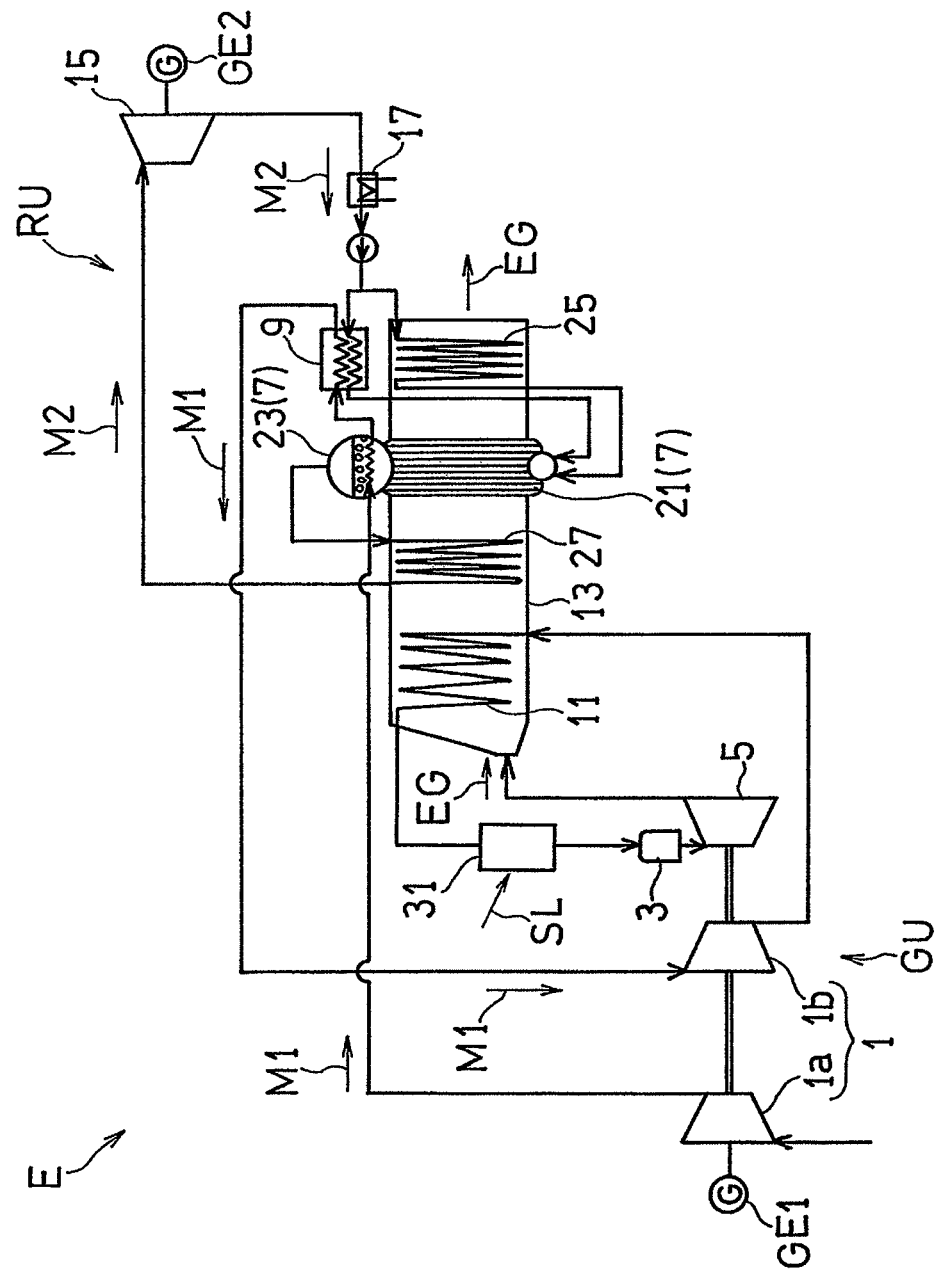
FIG. 4 is a block diagram showing a modification of the gas turbine engine system in FIG. 1.

In addition, as a modification of the present embodiment, as shown in FIG. 4, a solar heater 31 which uses sunlight SL as a heat source may be additionally provided at the upstream side of the combustor 3 as a heater which heats the first working medium M1 compressed by the compressor 1. By providing such a configuration and heating the first working medium M1 again by using the sunlight SL which is natural energy, the efficiency of the engine system E is further improved. It should be noted that the Rankine cycle engine unit RU may be configured as an ordinary steam turbine using water as the second working medium M2.

As described above, in the engine system E according to the present embodiment, the Rankine cycle engine unit RU is driven by using not only the exhaust heat from the first turbine 5 of the gas turbine engine unit GU but also the heat of the first working medium M1 passing through the compressor 1, and thus it is possible to obtain very high efficiency for the entire engine system E.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Compressor
3 . . . Combustor (Heater)
5 . . . First turbine
7 . . . Exhaust heat boiler
9 . . . Intermediate cooler
11 . . . Regenerator
13 . . . Exhaust duct
31 . . . Solar heater
E . . . Gas turbine engine system
EG . . . Exhaust gas
GU . . . Gas turbine engine unit
RU . . . Rankine cycle engine unit
M1 . . . First working medium
M2 . . . Second working medium

What is claimed is:

1. A gas turbine engine system comprising:
a compressor configured to compress a first working medium, the compressor comprising a low-pressure compression part and a high-pressure compression part;
a heater configured to heat the compressed first working medium utilizing an external heat source;
a turbine configured to output power from the first working medium; and
a Rankine cycle engine comprising:
an intermediate cooler provided at the compressor; and
an exhaust heat boiler configured to:
use an exhaust gas discharged from the turbine as a heating medium of a second working medium,
cool the first working medium compressed by the low-pressure compression part of the compressor, and
supply the first working medium to the intermediate cooler,
wherein the intermediate cooler is configured to:
further cool the first working medium cooled by the exhaust heat boiler using the second working medium as a cooling medium of the first working medium,
supply the first working medium to the high-pressure compression part,
heat the second working medium, and
supply the second working medium to the exhaust heat boiler.

2. The gas turbine engine system as claimed in claim 1, wherein the second working medium is an organic substance.

3. The gas turbine engine system as claimed in claim 1, wherein the second working medium flowing from the intermediate cooler into the exhaust heat boiler is a superheated gas.

4. The gas turbine engine system as claimed in claim 1 comprising, as the heater, a solar heater configured to heat the first working medium utilizing sunlight as a heat source.

* * * * *